United States Patent
Homa et al.

(10) Patent No.: US 7,526,160 B1
(45) Date of Patent: Apr. 28, 2009

(54) OPTICAL FIBER BRAGG GRATING WITH IMPROVED HYDROGEN RESISTANCE

(75) Inventors: Daniel Scott Homa, Blacksburg, VA (US); Justin Crusse, York, PA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/004,233

(22) Filed: Dec. 20, 2007

(51) Int. Cl.
*G02B 6/34* (2006.01)
*G02B 6/02* (2006.01)

(52) U.S. Cl. .......................... 385/37; 385/123; 385/142

(58) Field of Classification Search ................ 385/31, 385/37, 123, 124, 141–143
See application file for complete search history.

(56) References Cited

U.S. PATENT DOCUMENTS

| | | | |
|---|---|---|---|
| 5,478,371 A | 12/1995 | Lemaire et al. | |
| 5,838,700 A * | 11/1998 | Dianov et al. | 372/6 |
| 6,104,852 A | 8/2000 | Kashyap | |
| 6,221,566 B1 | 4/2001 | Kohnke et al. | |
| 6,580,854 B1 * | 6/2003 | Enomoto et al. | 385/37 |
| 6,807,324 B2 | 10/2004 | Pruett | |
| 6,947,650 B1 | 9/2005 | Homa | |
| 6,970,630 B2 | 11/2005 | Sigel, Jr. et al. | |
| 6,993,241 B2 | 1/2006 | Bagnasco et al. | |
| 7,103,250 B1 | 9/2006 | Zhang et al. | |
| 7,162,123 B2 | 1/2007 | Andre et al. | |
| 7,171,093 B2 | 1/2007 | Kringlebotn et al. | |
| 7,217,584 B2 | 5/2007 | Yue et al. | |
| 7,257,301 B2 * | 8/2007 | Homa et al. | 385/123 |
| 2005/0284183 A1 | 12/2005 | Sigel, Jr. et al. | |
| 2006/0222306 A1 | 10/2006 | Homa et al. | |
| 2007/0047867 A1 | 3/2007 | Goldner | |

OTHER PUBLICATIONS

Lemaire, Paul J. "Reliability of Optical Fibers Exposed to Hydrogen: Prediction of Long-Term Loss Increases"; Optical Engineering; Jun. 1991; vol. 30, No. 6 pp. 780-789.

* cited by examiner

*Primary Examiner*—Sung H Pak
*Assistant Examiner*—Daniel Petkovsek

(57) ABSTRACT

Hydrogen-induced losses in germanium-doped fibers is significantly reduced by increasing the concentration of oxygen in the core region of the glass. The increase in oxygen functions to "heal" the germanium-deficient defects, thus substantially reducing the sites where hydrogen bonding can intrude. Advantageously, the presence of the excess oxygen does not compromise the ability to create UV-induced gratings in the fiber's core area. Indeed, the stability of the glass has been found to increase even further during UV radiation. Thus, an FBG structure suitable for use in harsh, high temperature environments can be formed.

14 Claims, 3 Drawing Sheets

FIG. 1
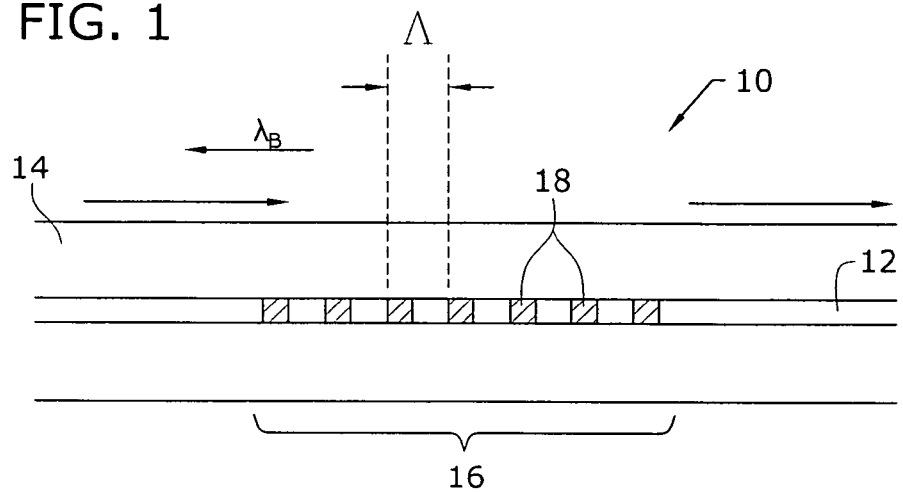
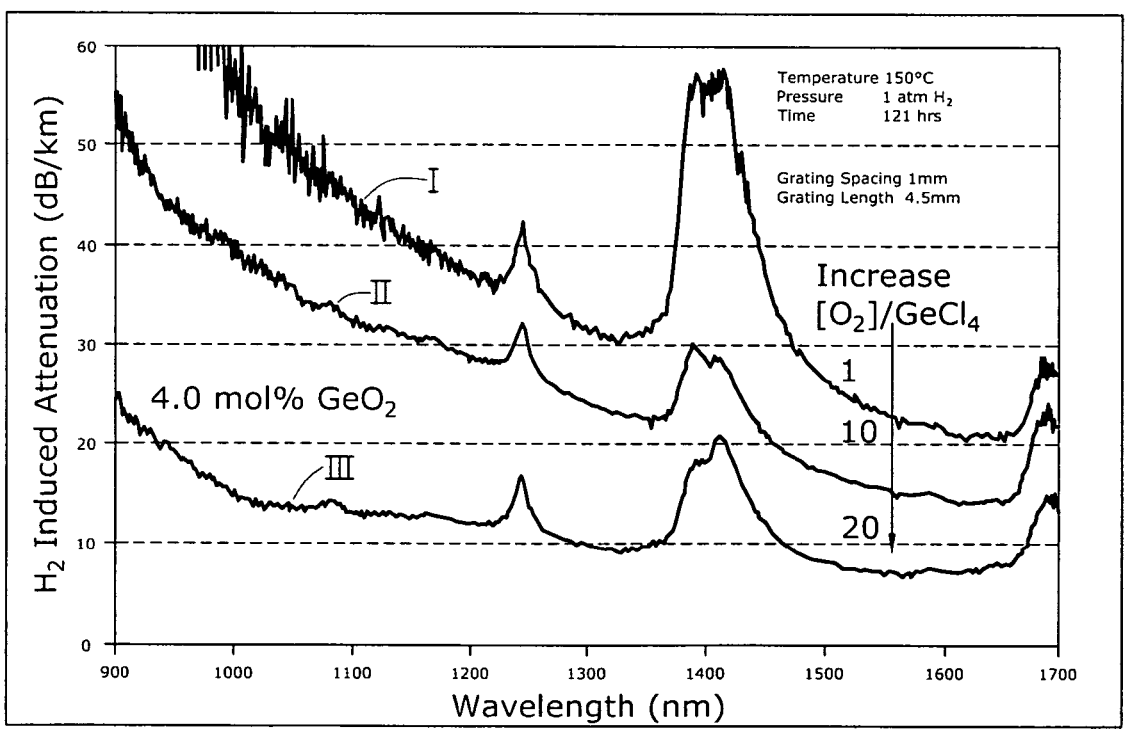
FIG. 2

OPTICAL FIBER BRAGG GRATING WITH IMPROVED HYDROGEN RESISTANCE

TECHNICAL FIELD

The present invention relates to an optical fiber Bragg grating and, more particularly, to a optical fiber Bragg grating particularly well-suited for applications in harsh environments.

BACKGROUND OF THE INVENTION

A fiber Bragg grating (FBG) is a permanent periodic refractive index modulation in the core of a single-mode optical silica glass fiber over a length of typically 1-100 mm. It can be created in a photosensitive fiber (i.e. a fiber including a photosensitive dopant, such as germanium) by transversely illuminating the fiber with a periodic interference pattern generated by ultra-violet (UV) laser light. The refractive index modulation in a standard FBG is believed to be formed by UV-induced breaking of electronic bonds in the Ge-based defects, releasing electrons which are thereafter re-trapped at other sites in the glass matrix. This rearrangement of the bonds causes a change in the fiber's absorption spectrum and density, thereby changing the refractive index of the glass. It is well-known that an FBG reflects light within a narrow bandwidth (typically 0.1-0.3 nm), centered at the Bragg wavelength $\lambda_B = n_{eff} \Lambda$, where $n_{eff}$ is the effective refractive index seen by the light propagating in the fiber, and $\Lambda$ is the physical period of the refractive index modulation.

It is known that the reflected Bragg wavelength $\lambda_B$ from an FBG will change with any external perturbation which changes the effective refractive index seen by the propagating the light and/or the physical grating period ($\Lambda$), such as temperature and strain. By measuring the reflected Bragg wavelength $\lambda_B$ (using, for example, a broadband light source and a spectrometer), an FBG can be used as a sensor for measuring such external perturbations. A standard UV-induced FBG can be made thermally stable up to 150-200° C. and thus used as a sensor up to this limit. Unfortunately, at higher temperatures the UV-induced refractive index modulation decays and the grating is erased.

FBGs can also be used as a pressure sensor by measuring the shift in Bragg wavelength caused by hydrostatic pressure-induced compression of the silica glass fiber. An FBG pressure sensor can be made with relatively small dimensions, good reproducibility and long-term stability, provided by the all-silica construction of the sensor. An all-fiber FBG sensor with enhanced pressure sensitivity and inherent temperature compensation can be made by using a passive or an active fiber laser FBG written in a birefringent side-hole fiber, the fiber having two open channels (holes) symmetrically positioned on each side of the fiber core. See, for example, U.S. Pat. Nos. 5,828,059 and 5,841,131. It is also possible to make FBG pressure sensors with enhanced pressure sensitivity by using a glass transducer element surrounding the optical fiber, either to convert pressure to strain/compression in the fiber or to convert pressure to fiber birefringence.

In addition, diffusion of gases (such as hydrogen) into the core of the fiber will cause a change in the refractive index proportional to the hydrogen concentration, and consequently modify the Bragg wavelength of an FBG written into the core of the fiber. Hydrogen will also cause an increase in signal loss along an optical fiber, which has been found to be detrimental for FBG-based rare-earth doped fiber lasers. Finally, diffusion of gases into the holes of a side-hole fiber will change the pressure inside the holes, and hence the pressure difference which affects the measurement of the external hydrostatic pressure.

U.S. Pat. No. 5,925,879 discloses the use of a carbon coating on an FBG sensor to protect the optical fiber and sensors when exposed to a harsh environment. Carbon has been shown to provide a good hermetic coating for optical fibers, making them essentially impermeable to both water and hydrogen, thus maintaining the mechanical strength and low loss of the fiber. A carbon coating can be applied to an optical fiber during the drawing process before the fiber glass cools through a pyrolytic process (see, for example, U.S. Pat. No. 5,000,541). Carbon coating using a similar technique can also be applied to splices between hermetic fibers to maintain hermeticity after splicing of carbon-coated fibers, as disclosed in U.S. Pat. No. 4,727,237. In the latter patent, a pyrolytic technique is used based on heating the fiber splice region with a $CO_2$ laser inside a chamber containing a reactant gas, causing a carbon coating to form on the glass surface by pyrolysis of the reactant gas. However, the temperature in the fiber needs to exceed 1000° C. to provide highly hermetic coatings. A standard FBG in a germanium-doped silica fiber cannot be carbon coated using such a process since the grating will be erased, as discussed above, by the high temperature involved in the process.

Thus, a need remains in the art for a technique to form protected FBGs that may be used in high temperature, harsh environments without experiencing the hydrogen-induced losses associated with the prior art.

SUMMARY OF THE INVENTION

The needs remaining in the art are addressed by the present invention, which relates to an optical fiber Bragg grating and, more particularly, to a optical fiber Bragg grating particularly well-suited for applications in harsh environments.

In accordance with the present invention, hydrogen-induced losses in core-doped fibers is significantly reduced by increasing the concentration of oxygen in the core region of the glass. It has been found that the increase in oxygen functions to "heal" the dopant-deficient defects, thus substantially reducing the sites where hydrogen bonding can intrude. Advantageously, the presence of the excess oxygen does not compromise the ability to create UV-induced gratings in the fiber's core area. Indeed, the stability of the glass has been found to increase even further during UV radiation. Thus, an FBG structure suitable for use in harsh, high temperature environments can be formed. The core dopant may comprise germanium, or alternatively, any one of the materials selected from the group consisting of Al, Ga, Zn, In, Zr, Bi, Sn, Pb, Sb, P, B or a like photosensitive material utilizes to form gratings within optical fibers.

In one embodiment of the present invention, an increase in oxygen is provided by modifying the ratio of oxygen to germanium tetrachloride flows during MCVD processing (i.e., Modified Chemical Vapor Deposition—one of the conventional, well-known methods of fabricating an optical fiber). Compounds other than germanium tetrachloride may be used.

Other and further aspects and advantages of the present invention will become apparent during the course of the following discussion and by reference to the accompanying drawings.

BRIEF DESCRIPTION OF THE DRAWINGS

Referring now to the drawings,

FIG. 1 is a cut-away side view of an exemplary, fiber Bragg grating (FBG) formed in accordance with the present invention;

FIG. 2 is a graph of hydrogen-induced loss in an optical fiber as a function of wavelength, illustrating the reduction in loss as the oxygen concentration in the fiber's core region is increased, in accordance with the teachings of the present invention;

DETAILED DESCRIPTION

Figure 3:
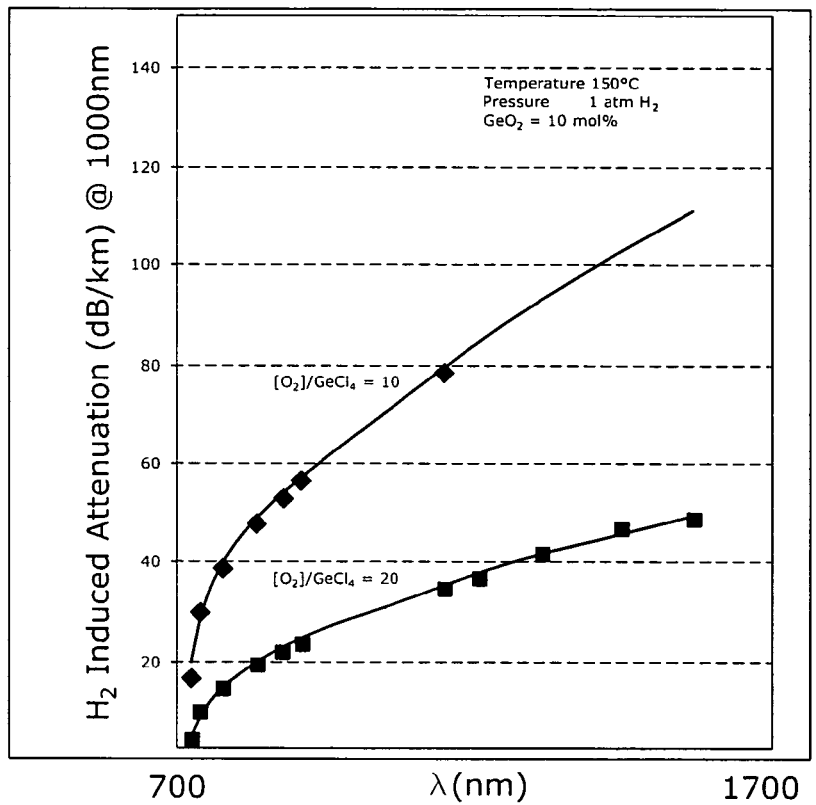
FIG. 3 is a graph of hydrogen-induced loss at a wavelength of 1000 nm, illustrating the reduction of the oxygen defect species in the fiber as the oxygen concentration in the core region of the FBG is increased.

As mentioned above, fiber optic sensors may be used in the petroleum and gas industry to obtain various downhole measurements, such as pressure and/or temperature within the boring. A string of optical fibers within a fiber optic system may be used to communicate information from wells as they are being drilled, in addition to communicating information from completed wells. Alternatively, an optical fiber may be deployed with a single point pressure-temperature fiber optic sensor. Additionally, a series of weakly reflecting fiber Bragg gratings (FBGs) may be written into a length of optical fiber, or a single point Fabry-Perot sensor may be spliced into a length of optical fiber. In these FBG applications, an optical signal is transmitted down the fiber, which is reflected and/or scattered back to a receiver and analyzed to characterize external parameters (e.g., reflected optical signal wavelength) along the length of the optical fiber. Using this information, downhole measurements including but not limited to temperature, pressure and chemical environment may be obtained.

However, when conventional optical fibers such as germanium-doped silica fibers are exposed to the intense heat, pressure and chemical-rich environment of an oil well, attenuation losses increase significantly. This increase in loss of optical strength of the signal is due, in part, to the diffusion of hydrogen into the glass structure. There are two general types of permanent (i.e., reaction-based) hydrogen losses that occur in such fibers. The first type of loss, referred to hereinafter as short wavelength edge (SWE)-induced loss, is associated with dopant (e.g., germanium) deficient-type defects along the fiber. (The other type of loss, associated with OH formation, is not problematic at the wavelengths associated with applications of the present invention.) With respect to SWE-induced loss, hydrogen atoms will bond to any open or weak bonds in the glass structure, such as to certain dopant atoms (e.g., Ge, Sn, Pb, Sb, B, P) in the vicinity of dopant-oxygen deficient centers, or to form SiOH and/or "dopant"OH. For germanium-doped fibers, the attenuation increases rapidly with increases in temperature. Inasmuch as temperatures in a typical oil or gas well generally range from slightly less than surface temperature near the surface to between about 90 to 250° C., conventional germanium-doped optical fibers are not sufficiently stable for prolonged use at depth in a well. While coating germanium-doped silica fiber with carbon or similar molecularly dense materials is an effective way to reduce hydrogen diffusion into the glass at lower temperatures, the effectiveness of the carbon coating diminishes rapidly as the ambient temperature increases.

As illustrated in the accompanying drawings and discussed in detail below, the present invention is directed to an optical fiber with an intentionally increased amount of oxygen introduced into the core to minimize hydrogen-induced losses at elevated temperatures. FIG. 1 illustrates an exemplary optical fiber 10 of the present invention, which comprises a germanium-doped, oxygen-rich core region 12 and a silica glass cladding layer 14 formed to surround oxygen-rich core region 12. A fiber Bragg grating (FBG) 16 is formed in core region 12 via conventional UV exposure, as discussed above, which has been found to modify the refractive index in regions 18 so that fiber 10 will reflect light propagating at the "Bragg wavelength" $\lambda_B$, all other wavelengths continuing to propagate along fiber 10. The spacing $\Lambda$ between regions 18 is defined as the period of FBG 16.

In accordance with the present invention, hydrogen-induced losses within fiber 10 are reduced by increasing the concentration of oxygen in core region 12. For example, the ratio of oxygen to germanium tetrachloride flows during MCVD processing can be controlled in a known manner to provide the desired increase in oxygen concentration. FIG. 2 is a graph of hydrogen-induced loss as a function of wavelength for an optical signal propagating through an optical fiber of the type described above in association with FIG. 1. In particular, FIG. 2 includes a set of three plots (I, II and III), plot I associated with an $O_2$:$GeCl_4$ ratio of 1:1, plot II associated with an $O_2$:$GeCl_4$ ratio of 10:1, and plot III associated with an $O_2$:$GeCl_4$ ratio of 20:1, where there is an increase in oxygen concentration in moving from plot I to plot II to plot III. In general, by increasing the concentration of oxygen, the oxygen-deficient type defects are reduced, thus reducing SWE loss (as shown by the dramatic decrease in hydrogen-induced loss along the short wavelength region).

Figure 4:
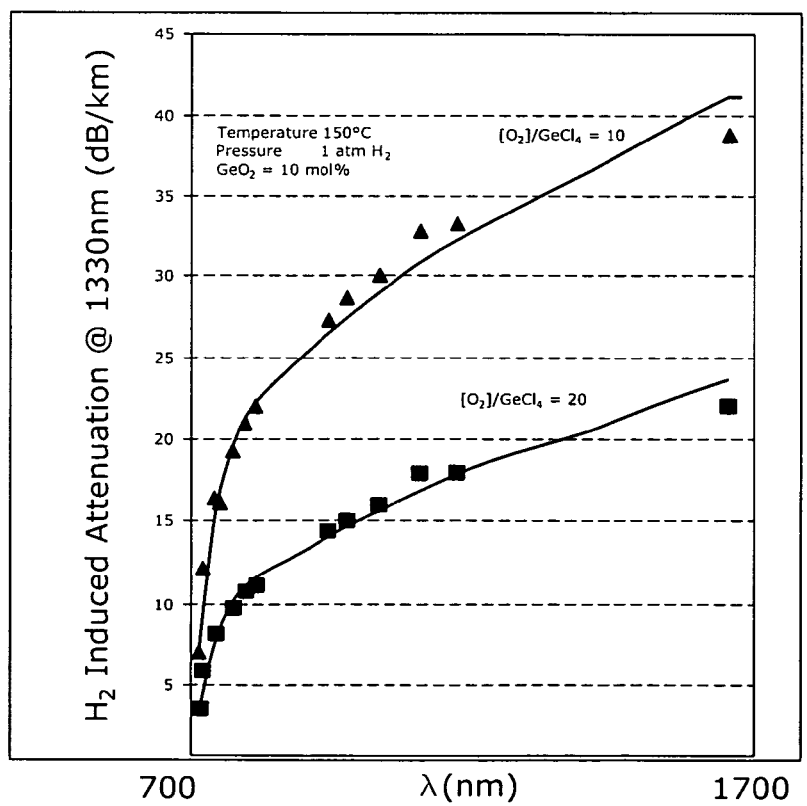
FIG. 4 is a graph similar to that of FIG. 3, in this case plotted for a wavelength of 1550 nm, a standard operating wavelength.

Also evident in the graphs of FIG. 2 is the absorption peak at the 1410 nm wavelength. It can be seen that the absorption peak becomes more prevalent as the number of GeOH species increases (that is, as the oxygen concentration increases). As further shown in FIG. 3, the hydrogen-induced loss dramatically decreases as the oxygen concentration increases. In particular, FIG. 3 illustrates hydrogen-induced attenuation as a function of wavelength for an FBG having a center wavelength of 1500 nm. The upper curve in the plot of FIG. 3 is associated with a 10:1 ratio of $O_2$ to $GeCl_4$, where the lower curve is associated with increased concentration ratio of 20:1. The loss within the wavelength range associated with downhole monitoring applications is seen to be on the order of 10-20 kB/km. FIG. 4 contains similar curves associated with an FBG center wavelength of 1000 nm, again illustrating the effect of the SWE loss mechanism as the oxygen concentration increases.

Figure 5:
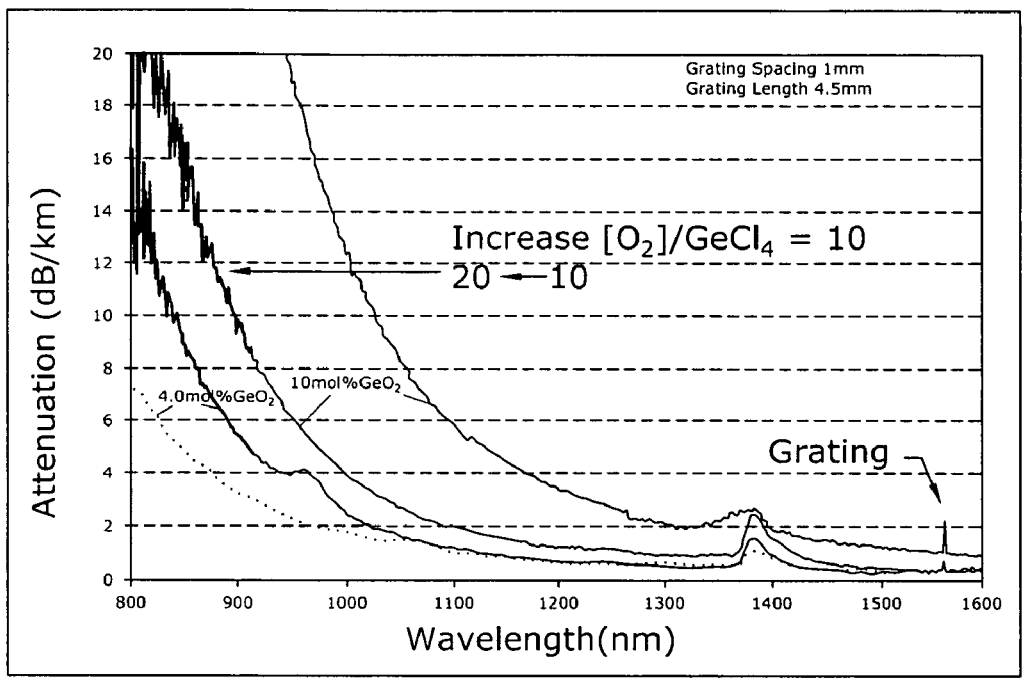
FIG. 5 contains a plot illustrating the increase in attenuation of optical fiber exposed to UV radiation in the formation of FBSs.

As further mentioned above, the higher concentration of oxygen in the fiber core of the inventive arrangement will result in improving the stability of the glass when exposed to radiation during grating fabrication (the radiation being, for example, UV radiation, gamma radiation, or any other spectral region sufficient to induce the change in refractive index within the doped glass). FIG. 5 contains a graph illustrating the increased attenuation in optical fiber exposed to UV radiation during an on-line grating fabrication of exemplary fiber Bragg gratings (FBGs) having a length L of about 4.5 mm and a period Λ of about 1.0 mm. The short wavelength UV-induced attenuation is minimized by both a reduction in germanium concentration, and an increase in the $O_2/GeCl_4$ ratio during deposition. Again, the results are shown for fibers with an approximate germania concentration of 4.0 mol % and 10.0 mol %, as well as for $O_2$:$GeCl_4$ ratios of 10 and 20. By increasing the oxygen concentration within the core region, the attenuation is shown to decrease. Moreover, by increasing the oxygen, the photosensitivity of the core material will decrease, resulting in a decrease in reflectivity (or amplitude) of the grating. Therefore, by increasing the presence of oxygen in the core region, a grating may be formed of lower reflectivity without needing to modify either the numerical aperture (NA) or refractive index profile of the fiber.

Figure 6:
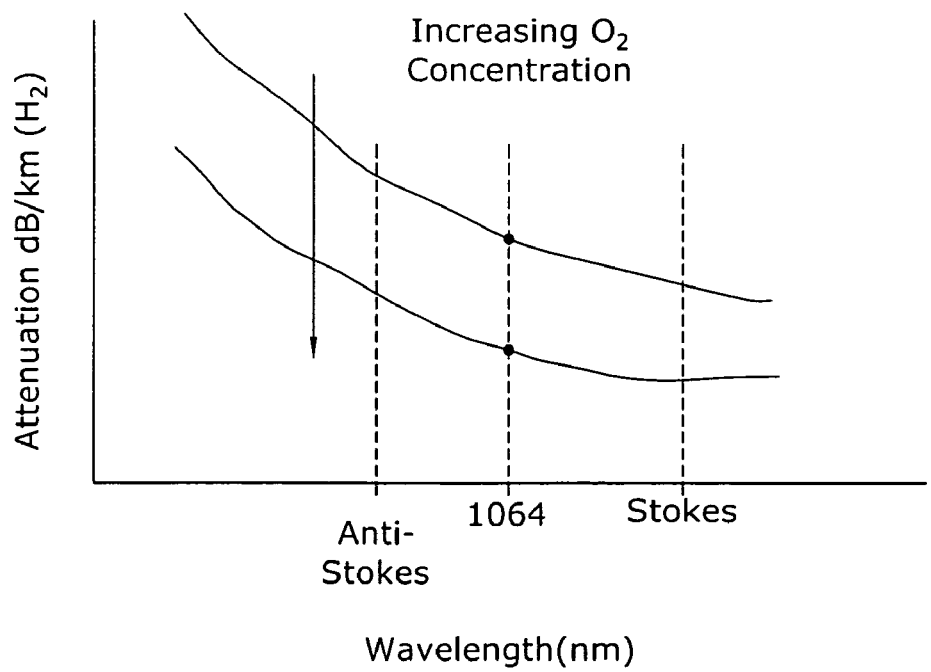
FIG. 6 is a plot illustrating the reduction in hydrogen-induced loss for distributed temperature sensing (DTS) applications.

The introduction of additional oxygen in the fiber core of a germanium-doped multimode fiber may also improve the performance of the fiber when used in distributed temperature sensing (DTS) applications, particularly as shorter wavelengths such as 1064 nm. FIG. 6 is a graph illustrating the decrease in hydrogen-induced attenuation as a function of wavelength for the DTS application, showing in particular the reduction of hydrogen-induced loss at the wavelength of 1064 nm as the oxygen concentration increases. Furthermore, it can be shown that the hydrogen-induced increase in differential attenuation between the anti-Stokes wavelength of 1016 nm and the Stokes wavelength of 1116 nm, in the high numerical apertures grating fiber (NA=0.20), is dramatically reduced with an increase in oxygen, as shown in Table I, below. Additionally, the ratio between these two wavelengths will also decrease with an increase in oxygen concentration. Implementation of the inventive fiber thus results in provided a more stable DTS measurement in a hydrogen-rich environment. While this example is associated with a single mode fiber, it is to be understood that similar results may be found in multimode fibers, which are well-suited for DTS applications.

TABLE I

Improved Short Wavelength Stability in Hydrogen

| $[O_2]/[GeCl_4]$ | 1 | 10 | 20 |
|---|---|---|---|
| Differential Attenuation (dB/km) | 11.24 | 5.67 | 1.35 |
| anti-Stokes/Stokes (dB/km) | 1.26 | 1.18 | 1.10 |

While it is apparent that the illustrative embodiments of the invention disclosed herein fulfill the objectives of the present invention, it is to be appreciated that numerous modifications and other embodiments may be devised by those skilled in the art. Additionally, feature(s) and/or element(s) from any embodiment may be used singly or in combination with feature(s) and/or element(s) from other embodiment(s). Therefore, it will be understood that the appended claims are intended to cover all such modifications and embodiments, which would come within the spirit and scope of the present invention.

What is claimed is:

1. An optical fiber Bragg grating comprising:
a doped silica glass core region including a Bragg grating formed therein, the core region having an oxygen/dopant ratio of at least 10:1 to reduce the presence of hydrogen bonding sites and minimize hydrogen-induced losses in an optical signal propagating therealong; and
a cladding layer formed to surround the doped silica glass core region for confining a propagating optical signal within said core region.

2. An optical fiber Bragg grating as defined in claim 1 wherein the Bragg grating comprises a UV-induced Bragg grating, the UV radiation, in combination with the increased oxygen dopant ratio of at least 10:1 further reducing hydrogen-induced losses.

3. An optical fiber Bragg grating as defined in claim 2 wherein the oxygen/dopant ratio of at least 10:1 maintains the stability of the doped silica glass core region when exposed to radiation.

4. An optical fiber Bragg grating as defined in claim 3 wherein the oxygen/dopant ratio of at least 10:1 maintains the stability of the doped silica core region when exposed to UV radiation.

5. An optical fiber Bragg grating as defined in claim 3 wherein the oxygen/dopant ratio of at least 10:1 maintains the stability of the doped silica core region when exposed to gamma radiation.

6. An optical fiber Bragg grating as defined in claim 1 wherein the core region dopant comprises a dopant selected from the group consisting of: Al, Ga, Zn, In, Zr, Bi, Ge, Sn, Sb, Pb, P and B.

7. An optical fiber Bragg grating as defined in claim 6 wherein the core region dopant comprises Ge.

8. An optical fiber Bragg grating as defined in claim 1 wherein the oxygen/dopant ratio is at least 20:1.

9. An optical fiber Bragg grating as defined in claim 1 wherein the oxygen/dopant ratio of at least 10:1 and increasing to at least 20:1 is selected to provide a desired level of reflectivity along the grating, where a lower oxygen value near 10:1 is associated with a greater reflectivity and a higher oxygen value near 20:1 is associated with a lesser reflectivity.

10. An optical fiber Bragg grating as defined in claim 1 wherein the core is formed by a Modified-Chemical Vapor Deposition process having an increased flow of oxygen therethrough.

11. A multimode optical fiber for distributed temperature sensing applications, the multimode fiber comprising:
a doped silica glass core region having an oxygen/dopant ratio of at least 10:1 to reduce the presence of hydrogen bonding sites and minimize hydrogen-induced losses in an optical signal propagating therealong; and
a cladding layer formed to surround the doped silica glass core region for confining a propagating optical signal within said core region.

12. A multimode optical fiber as defined in claim 11 wherein the oxygen/dopant ratio of at least 10:1 is calculated to minimize the hydrogen-induced differential attenuation between the anti-Stokes and Stokes wavelengths of an optical signal of a predetermined signal wavelength propagating therethrough.

13. A multimode optical fiber as defined in claim 11 wherein the propagating optical signal operates at a predetermined signal wavelength of approximately 1064 nm.

14. A multimode optical fiber as defined in claim 11 wherein the propagating signal operates at a predetermined signal wavelength of approximately 1550 nm.

* * * * *